United States Patent [19]

Kostjukov et al.

[11] 4,237,336

[45] Dec. 2, 1980

[54] DEVICE FOR PASSING ELECTRICAL AND POWER INSTALLATION CONDUCTORS THROUGH PROTECTIVE SHELL SEPARATING CLEAN ZONE FROM CONTAMINATED ONE AND METHOD OF ASSEMBLING SAME

[76] Inventors: Nikolai S. Kostjukov, Profsojuznaya ulitsa, 93, korpus 1, kv. 115; Nikolai V. Minakov, 9 ulitsa Sokolinoi gory, 7, kv. 100; Vladimir A. Knyazev, Reutovskaya ulitsa, 8, korpus 3, kv. 41, all of Moscow, U.S.S.R.

[21] Appl. No.: 942,318

[22] Filed: Sep. 14, 1978

[30] Foreign Application Priority Data

Jan. 16, 1978 [SU] U.S.S.R. ............................. 2561803

[51] Int. Cl.$^2$ .................... G21C 13/04; H01B 17/30
[52] U.S. Cl. ............................ 174/151; 29/592 R; 174/13; 174/18
[58] Field of Search ............ 174/11 R, 11 BH, 12 R, 174/12 BH, 13, 21 CA, 18, 99 E, 151, 152 R; 29/592 R

[56] References Cited

U.S. PATENT DOCUMENTS

| | | | |
|---|---|---|---|
| 3,520,989 | 7/1970 | Funk et al. ........................ | 174/151 |
| 3,573,342 | 4/1971 | Graybill et al. ................... | 174/13 X |
| 3,735,024 | 5/1973 | Walker, Sr. ........................ | 174/151 |
| 3,801,722 | 4/1974 | Korner .............................. | 174/11 R |
| 3,856,983 | 12/1974 | Fisher et al. ...................... | 174/151 |
| 3,949,152 | 4/1976 | Floessel ............................ | 174/13 |
| 4,058,671 | 11/1977 | Panek et al. ...................... | 174/151 |

FOREIGN PATENT DOCUMENTS

| | | | |
|---|---|---|---|
| 914403 | 7/1954 | Fed. Rep. of Germany ............. | 174/13 |
| 1640495 | 12/1971 | Fed. Rep. of Germany . | |
| 1340207 | 9/1963 | France ............................... | 174/151 |
| 1140637 | 1/1969 | United Kingdom ................ | 174/18 |
| 1206564 | 9/1970 | United Kingdom ............... | 174/152 R |

*Primary Examiner*—Laramie E. Askin
*Attorney, Agent, or Firm*—Fleit & Jacobson

[57] ABSTRACT

The present invention relates to the field of electrical engineering. A device for passing electrical and power installation conductors through a protective shell separating a clean zone from a contaminated one comprises a hollow metal casing in the form of a tube with end flanges embedded in the body of the protective shell, the latter having a metal shield attached to the contaminated zone side of the shell. The metal casing contains a main insulating through element having at least one hole through which the conductor is passed, the ends of the conductor being in the clean and contaminated zones. Each end of the conductor is fitted with additional insulating through elements fixed to seal fittings rigidly coupling the additional insulating through elements with the end flanges and the conductor ends. The conductor has at least one section in the form of a rod on the contaminated zone side and a thermocompensating multi-strand section coupled electrically to the rod.

8 Claims, 3 Drawing Figures

4,237,336

DEVICE FOR PASSING ELECTRICAL AND POWER INSTALLATION CONDUCTORS THROUGH PROTECTIVE SHELL SEPARATING CLEAN ZONE FROM CONTAMINATED ONE AND METHOD OF ASSEMBLING SAME

FIELD OF THE INVENTION

This invention relates to the field of electrical engineering, and more particularly to devices for passing the conductors of electrical and power installations through a protective shell separating a clean zone from a contaminated one.

The invention may serve to pass conductors into large volumes; for instance, into the contaminated zone within the protective shell of any type of nuclear power station reactor and, also, smaller volumes of, say, thermal vacuum test chambers, autoclaves and other electrical installations with protective shells and envelopes.

The present invention can be used to greatest advantage in cases where it becomes necessary to simultaneously supply a high voltage and a heavy load current (in the order of thousands of amperes) to electrical equipment placed within the internal contaminated zone of the protective shell of, say, a nuclear power station reactor.

BACKGROUND OF THE INVENTION

When supplying the electrical equipment within the internal contaminated zone of a protective shell, it is essential to bring the conductor into the zone in such a way as to prevent the escape of the contaminated medium (vapour-gas mixtures, chemically aggressive vapours, radioactive radiation, etc.), i.e. to ensure adequate biological shielding and protection of the personnel and environment.

When dealing with heavy currents, it is necessary to combine a high current-carrying capacity of the conductor with a high resistance to the effect of continuously applied high temperatures under normal operating conditions and the short-term effect of still higher temperatures and mechanical stresses under emergency conditions.

Known in the art is a through insulator (cf. Federal Republic of Germany Printed Patent Specification No. 1,640,495) representing a closed system in the form of a steel tube closed by end flanges and placed within the body of the protective shell. The tube contains rigidly fixed current-carrying conductors.

Such an arrangement of the conductors does not provide for sufficient operational reliability at load currents of several hundreds of amperes and higher, nor does it rule out the possibility of the conductors coming into contact or closely approaching one another, thus giving rise to an arc discharge and breakdown of the insulator due to the electrodynamic forces set up by the short-circuit current. The continuous and short-time effect of high temperatures occurring under emergency conditions in the absence of thermal compensation for the change in linear dimensions of the conductors leads to a loss of sealing of the insulator.

Also known is a device for passing the conductors of electrical and power installations through a protective shell separating a clean zone from a contaminated one (cf., U.S. Pat. No. 3,801,722), comprising a hollow metal casing in the form of a tube with end flanges fixed in the body of the protective shell, the latter having a metal shield attached to the side within the contaminated zone. The metal casing contains a main insulating through element having at least one through hole for the conductor passed from the clean zone into the contaminated one. The main insulating through element is composite—its parts, where the conductors are brought out of the insulating element, are made of an epoxy resin, and the remaining parts are of a silicone elastomer. The conductors brought into the main insulating element through the end flanges are the conductors of a multi-core cable. The cable conductors are arranged and positioned rigidly by the monolithic material of the composite parts of the main insulating through element.

The rigid positioning of the conductors within the main insulating through element does not allow one to compensate for the change in linear changes during the passage of heavy short-circuit currents and high temperature rise impairing the mechanical strength of the device.

Sealing of the known device is achieved in the mid part of the main insulating through element, but is insufficient at the entry and exit of the conductors.

The composite structure of the main insulating through element made up of different polymer materials also worsens the reliability of the device under emergency conditions and shortens its service life.

SUMMARY OF THE INVENTION

It is an object of the present invention to improve the service reliability of the device.

This object is accomplished by that in a device for passing electrical and power installation conductors through a protective shell separating a clean zone from a contaminated one, comprising a metal shield attached to the shell side within the contaminated zone, a hollow metal casing embedded in the body of the protective shell, said casing being in the form of a tube with end flanges, containing a main insulating through element having at least one through hole for passing the conductor with its ends in the clean and contaminated zones, in accordance with the invention, each end of the conductor is fitted with additional insulating through elements fixed to seal fittings rigidly coupling the additional insulating through elements with the end flanges and the conductor ends, the conductor having at least one section in the form of a rod on the contaminated zone side and a thermocompensating multi-strand section coupled electrically to the rod.

It is of advantage to give the thermocompensating multi-strand section a wave-shaped configuration.

It is also of advantage to make the thermocompensating section of a stack of crimped metal strips.

The hereinproposed device ensures reliable operation of electrical and power installations at specified parameters (load current, temperature, etc.) under normal and emergency duty conditions throughout the needed period of time at observance of safety rules and proper environmental protection.

The device can be easily dismantled when the need arises.

BRIEF DESCRIPTION OF THE ACCOMPANYING DRAWINGS

The invention will now be described in greater detail with reference to a specific embodiment thereof, taken in conjunction with accompanying drawings, wherein.

DETAILED DESCRIPTION OF THE INVENTION

Figure 1:
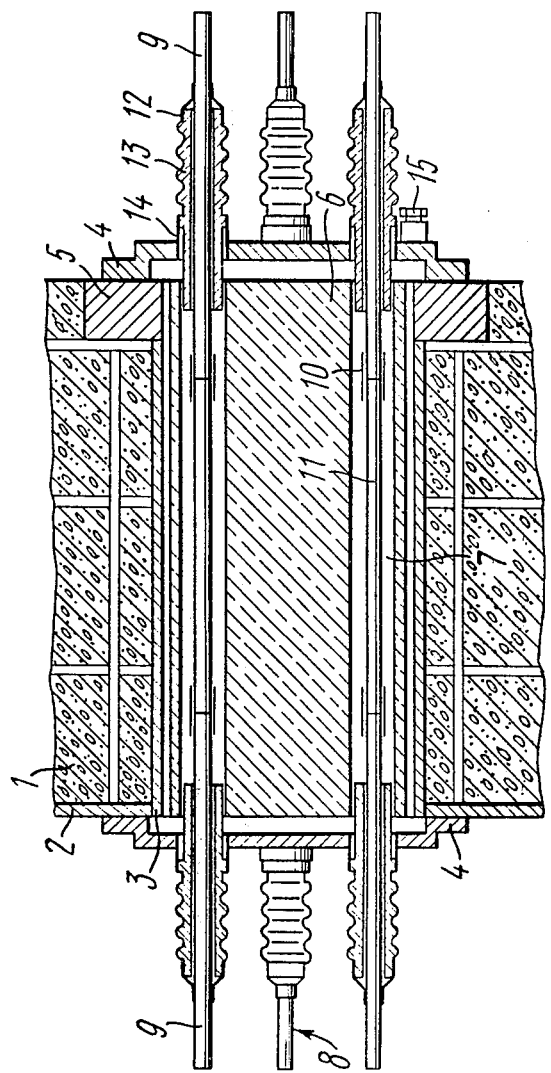
FIG. 1 is a sectional view of a device for passing electrical and power installation conductors through a protective shell separating a clean zone from a contaminated one, in accordance with this invention.

The device comprises a hollow metal casing 3 (FIG. 1) in the form of a tube with end flanges 4, fixed in the body of the protective shell 1, the latter having a metal shield 2 attached to the side facing the contaminated zone. The metal casing 3 has a supplementary flange 5 embedded in the body of the protective shell 1. To minimize heating, the metal casing 3 may be provided with a seam of a non-magnetic material along its entire length or be made completely of a nonmagnetic material (aluminum, copper or their alloys). The protective shell 1 is made of reinforced concrete or may be made of ordinary concrete in cases where emergency duty requirements are less stringent. The metal casing 3 accommodates a main insulating through element 6 made of an inorganic material, say, porcelain or alumina ceramics capable of withstanding the effect of high temperatures (up to 1000° C.) and having a high absorption capacity to induced radiation. The insulating element 6 has at least one through hole 7. In the case under consideration, there are four holes 7 arranged symmetrically along a fixing circumference. The conductors 8 are passed through the holes 7. The ends of each conductor 8 are in the clean and contaminated zones. The end of the conductor 8 is made, at least on the side of the contaminated zone, of a solid metal rod 9. In the case under consideration, the conductor 8 is made of a solid metal rod 9 both on the contaminated and clean sides of the shell. The metal rods 9 are connected electrically by means of sleeves 10 to thermocompensating multi-strand sections 11 of the conductor 8. The cap 12 of the seal fitting joins the conductor 8 with additional insulating through elements 13 made of an inorganic insulating material, for instance, porcelain or alumina ceramics. The insulating elements 13 have a glazed outer surface and, just as the main insulating through element 6, are capable of withstanding the effect of high temperatures and have a high radiation resistance. Bushes 14 of the seal fitting join the additional insulating through elements 13 with the end flanges 4. The end flange 4 on the clean zone side has a pipe union 15 that serves for checking the tightness of the device sealing.

Figure 2:
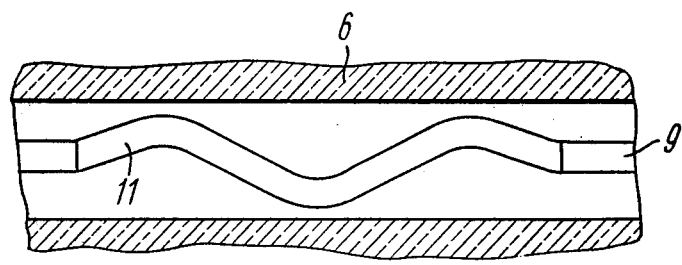
FIG. 2 is a sectional view of a conductor within the main insulating through element for the case where the thermocompensating section of the conductor is given a wave-shaped configuration, in accordance with this invention.

To improve the thermal compensation under extreme duty conditions, the multi-strand section 11 (see FIG. 2) may be given a wave-shaped configuration.

Figure 3:
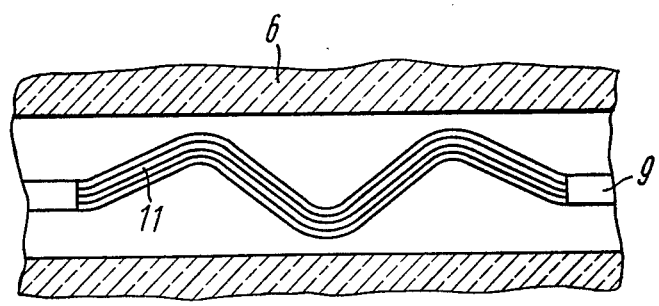
FIG. 3 is a sectional view of a conductor within the main insulating through element for the case where the thermocompensating section of the conductor is made of a stack of crimped metal strips.

To reduce the electrodynamic load in cases where the device is used for carrying heavy currents (in the order of scores of thousands of amperes), the thermocompensating section 11 (see FIG. 3) may be made of a stack of crimped metal strips.

The device for passing electrical and power installation conductors through a protective shell 1 (see FIG. 1) is mounted in the following way: first, the hollow metal casing 3 is welded to the metal shield 2 on the contaminated zone side and the surface of the shell 1 on the clean zone side. In cases where the hollow metal casing 3 is fixed in the body of the protective shell 1 of nuclear reactor, extra mechanical strength is ensured by welding the metal casing 3 to the net of the reinforced concrete shell 1 and the supplementary flange 5 provided on the clean zone side. The next step is to insert the main insulating through element 6 into the metal casing 3. The main insulating element 6 is centered evenly inside the metal casing 3 by spacers (not shown), then cement is injected into the resulting gap.

After that, the end flange 4 on the contaminated zone side, the additional insulating elements 13 and the conductor 8 are assembled in the following order. First, the additional insulating through elements 13 are positioned in respect to the end flanges 4 by brazing the bushes 14 to the latter. Then the caps 12 are brazed to the conductor 8 so as to position the latter in respect to the insulating elements 13.

Within the additional insulating element 13, on the contaminated zone side, the conductor 8 is in the form of a rod 9 and further on is connected electrically by a sleeve 10 to the thermocompensating section 11 of the conductor.

Then, the conductors 8 positioned within the end flanges 4 are passed through the holes 7 of the main insulating element 6, and the end flange 4 on the contaminated zone side is welded to the metal shield 2. After that, the above-described operations of positioning the additional insulating elements 13 and the end flanges 4, as well as the conductors 8 and the additional insulating elements 13 are performed in the same sequence on the clean zone side of the shell. On that side of the shell, the conductor 8 within the additional insulating element 13 may be in the form of a rod 9 or as a multi-strand conductor. The end flange 4 is connected to the protective shell 1 on the clean zone side either by welding or by mechanical means.

What is claimed is:

1. A device for passing electrical and power installation conductors through a protective shell separating a clean zone from a contaminated one, comprising:
    a metal shield attached to said protective shell on the contaminated zone side;
    a hollow metal casing made in the form of a tube embedded in the body of said protective shell;
    end flanges of said hollow metal casing;
    a first insulating through element arranged within said hollow metal casing made of inorganic material having a high absorption capacity to induced radiation and having at least one through hole;
    a conductor passed through said hole and having one end in said clean zone and one end in said contaminated zone;
    at least one section of said conductor in the form of a rod on the contaminated zone side;
    a thermocompensating multi-strand section of said conductor coupled electrically to said section of the conductor made of a rod;
    a second insulating through element formed of inorganic insulating material fitted on each said conductor end;
    seal fittings fixed to the second insulating through elements and rigidly linking the second insulating through elements with said end flanges and said conductor ends.

2. A device according to claim 1, wherein said thermocompensating multi-strand section has a wave-shaped configuration.

3. A device according to claim 1, wherein the thermocompensating multi-strand section is made of a stack of crimped metal strips.

4. A device according to claim 1, wherein said hollow metal casing is formed having a seam of nonmagnetic material along its entire length to minimize heating.

5. A device according to claim 1, wherein said hollow metal casing is made of a nonmagnetic metal to minimize heating.

6. A method for passing electrical and power installation conductors through a protective shell separating a clean zone from a contaminated zone, comprising the steps of:
forming a through passage in the protective shell;
installing a metal shield surrounding the through passage on the contaminated side of the shell;
placing a hollow metal casing in the through passage and welding the casing to the shell;
inserting an inorganic material insulating element having at least one through hole into said casing;
brazing at least one metal bushing to an end flange on the clean side and on the contaminated side to locate at least one additional insulating element on each end flange;
brazing an end cap onto a conductor to locate at least one conductor relative to said at least one additional insulating element;
installing the end flange over the end of the casing on the contaminated side;
placing said at least one additional insulating element in said bushing on said contaminated side;
inserting said conductor and cap into said at least one additional insulating element on said contaminated side and into said insulating element;
installing the end flange over the end of the casing on the clean side;
inserting the conductor and cap into the additional insulating element on the clean side and into the insulating element; and
electrically connecting the conductor inserted from the contaminated side to the conductor inserted from the clean side.

7. The method of claim 6, wherein the step of electrically connecting the conductors comprises the step of connecting the two conductors by means of a thermocompensating conductor section.

8. The method of claim 6, wherein the step of inserting the insulating element into the casing comprises the steps of:
centering said element in said casing by means of spacers, and
injecting cement into the gap formed between the element and the casing by action of the spacers.

* * * * *